(12) United States Patent
Obrovac et al.

(10) Patent No.: US 10,050,260 B2
(45) Date of Patent: Aug. 14, 2018

(54) ANODE COMPOSITIONS FOR RECHARGEABLE BATTERIES AND METHODS OF MAKING SAME

(71) Applicant: 3M INNOVATIVE PROPERTIES COMPANY, St. Paul, MN (US)

(72) Inventors: Mark N. Obrovac, Nova Scotia (CA); Xiuyun Zhao, Ontario (CA)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 10 days.

(21) Appl. No.: 15/312,202

(22) PCT Filed: May 27, 2015

(86) PCT No.: PCT/US2015/032526
§ 371 (c)(1),
(2) Date: Nov. 18, 2016

(87) PCT Pub. No.: WO2015/183860
PCT Pub. Date: Dec. 3, 2015

(65) Prior Publication Data
US 2017/0098820 A1    Apr. 6, 2017

Related U.S. Application Data

(60) Provisional application No. 62/004,296, filed on May 29, 2014.

(51) Int. Cl.
*H01M 4/00* (2006.01)
*H01M 4/134* (2010.01)
(Continued)

(52) U.S. Cl.
CPC .......... *H01M 4/134* (2013.01); *H01M 4/049* (2013.01); *H01M 4/0471* (2013.01);
(Continued)

(58) Field of Classification Search
CPC .. H01M 4/134; H01M 4/1395; H01M 4/0471; H01M 4/386; H01M 4/622;
(Continued)

(56) References Cited

U.S. PATENT DOCUMENTS 5,879,817 A * 3/1999 Brown, Jr. ............ C04B 41/009
405/211.1
6,221,522 B1  4/2001 Zafred
(Continued)

FOREIGN PATENT DOCUMENTS

JP    2014-26951    2/2014
WO   WO 2012-101450   8/2012

OTHER PUBLICATIONS

A.D. Wilson and J.W. Nicholson, "Acid-base Cements: Their Biomedical and Industrial Applications," Cambridge University Press, 1993, pp. 1-4, 90-91, and 116-146 (55 pages).
(Continued)

*Primary Examiner* — Cynthia H Kelly
*Assistant Examiner* — Monique M Wills
(74) *Attorney, Agent, or Firm* — Adam Bramwell

(57) ABSTRACT

An anode composition includes an electrochemically active material comprising silicon; and a cement.

20 Claims, 6 Drawing Sheets

(51) Int. Cl.
   *H01M 4/1395* (2010.01)
   *H01M 4/04* (2006.01)
   *H01M 4/38* (2006.01)
   *H01M 4/62* (2006.01)
   *H01M 10/0525* (2010.01)
   *H01M 4/02* (2006.01)

(52) U.S. Cl.
   CPC ......... *H01M 4/1395* (2013.01); *H01M 4/386* (2013.01); *H01M 4/622* (2013.01); *H01M 4/625* (2013.01); *H01M 10/0525* (2013.01); *H01M 2004/021* (2013.01); *H01M 2004/027* (2013.01); *H01M 2004/028* (2013.01); *H01M 2220/20* (2013.01); *H01M 2220/30* (2013.01)

(58) Field of Classification Search
   CPC .. H01M 4/625; H01M 4/049; H01M 10/0525; B32B 3/10; B32B 13/04
   See application file for complete search history.

(56) References Cited

U.S. PATENT DOCUMENTS

| | | | |
|---|---|---|---|
| 6,680,145 | B2 | 1/2004 | Obrovac |
| 7,875,388 | B2 | 1/2011 | Le |
| 7,906,238 | B2 | 3/2011 | Le |
| 8,287,772 | B2 | 10/2012 | Le |
| 2004/0210289 | A1 | 10/2004 | Wang |
| 2006/0003227 | A1* | 1/2006 | Aramata ............ H01M 4/0421 429/218.1 |
| 2008/0206641 | A1 | 8/2008 | Christensen |
| 2008/0248386 | A1 | 10/2008 | Obrovac |
| 2010/0288982 | A1 | 11/2010 | Le |
| 2011/0215280 | A1 | 9/2011 | Obrovac |

OTHER PUBLICATIONS

International Search Report for PCT International Application No. PCT/US15/32526 dated Aug. 19, 2015, 3 pages.

* cited by examiner

US 10,050,260 B2

ANODE COMPOSITIONS FOR RECHARGEABLE BATTERIES AND METHODS OF MAKING SAME

CROSS REFERENCE TO RELATED APPLICATIONS

This application is a national stage filing under 35 U.S.C. 371 of PCT/US2015/032526, filed May 27, 2015, which claims the benefit of U.S. Provisional Application No. 62/004,296, filed May 29, 2014, the disclosure of which is incorporated by reference in its/their entirety herein.

FIELD

The present disclosure relates to compositions useful as anodes for rechargeable batteries and methods for preparing and using the same.

BACKGROUND

Various anode compositions have been introduced for use in secondary batteries. Such compositions are described, for example, in U.S. Pat. Nos. 7,906,238 and 7,875,388, both by Le; U.S. Patent Application Publication No. 2010/0288982 by Le et al., and U.S. Patent Application Publication No. 2011/0215280 by Obrovac and Flodquist.

SUMMARY

In some embodiments, an anode composition is provided. The anode composition includes an electrochemically active material comprising silicon; and a cement.

In some embodiments, a method of making an anode composition is provided. The method includes combining (i) precursor materials of an electrochemically active material comprising silicon; and (ii) a base source to form a mixture. The method may further include milling the mixture to form a milled mixture; combining the milled mixture and an acid source to form a second mixture; and subjecting the second mixture to a heat treatment to form an acid-base cement monolith.

In some embodiments, a rechargeable battery is provided. The battery includes a cathode; an electrolyte; and an anode that includes an electrochemically active material comprising silicon, and a cement. In some embodiments, an electronic device is provided. The electronic device includes a rechargeable battery that includes a cathode; an electrolyte; and an anode that includes an electrochemically active material comprising silicon, and a cement.

The above summary of the present disclosure is not intended to describe each embodiment of the present invention. The details of one or more embodiments of the disclosure are also set forth in the description below. Other features, objects, and advantages of the invention will be apparent from the description and from the claims.

BRIEF DESCRIPTION OF THE DRAWINGS

The disclosure may be more completely understood in consideration of the following detailed description of various embodiments of the disclosure in connection with the accompanying figures, in which.

DETAILED DESCRIPTION

Figure 1:
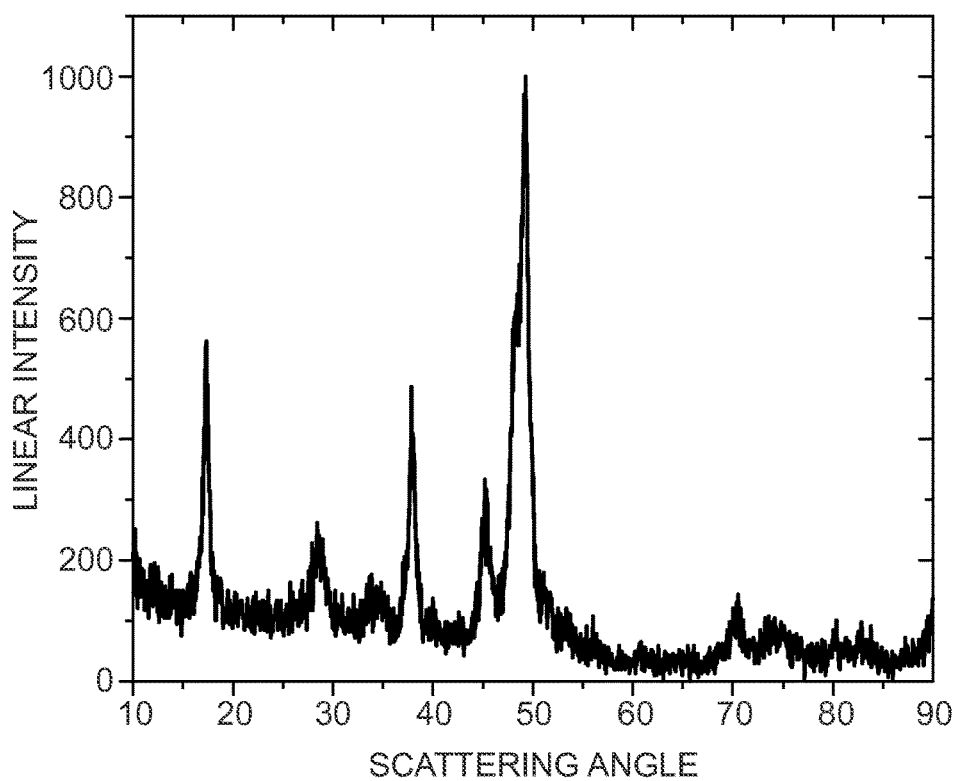
FIG. 1 depicts the XRD pattern of the composite particles of Example 1.

Alloy based materials (e.g., silicon based alloy materials) have been described for use as electrochemically active particles in negative electrodes for lithium-ion batteries. When made by ball milling or other similar methods, such electrochemically active particles typically consist of small particles having a particle size distribution with a D50 value of 3 μm in diameter or less. Electrode coatings made from such fine particles have high surface areas (for example, >3.6 m$^2$/g), which may lead to poor thermal stability and poor cycling characteristics as a result of increased reactivity between the active material particles and the battery electrolyte.

Prior approaches to increasing the size of the alloy active material particles (and thereby decreasing the surface area of electrode coatings made from such particles) include sintering a collection of the particles together (for example, by subjecting the particles to temperatures above 600° C.). However, at such temperatures, any electrochemically active phases within the particles have a tendency to crystallize, which has been shown to have a deleterious effect on cycling characteristics and thermal stability. Consequently, an approach for increasing the surface area of alloy active material particles for negative electrode compositions, which does not require high temperature treatment and does not negatively impact the cycling characteristics of the alloy active material, may be desirable. In this regard, the present disclosure is directed, in part, to decreasing the surface area of alloy active material particles for negative electrode compositions by the inclusion of acid-base cements in the compositions.

Definitions

In this document:

As used herein, "acid-base cement" refers to any cement that comprises an acid source and a base source capable of reacting to form a cementitious material.

As used herein, an "amorphous phase" is a phase that lacks long range atomic order and whose x-ray diffraction pattern lacks sharp, well-defined peaks.

As used herein, a "nanocrystalline phase" is a phase having crystallites no greater than about 50 nanometers that exhibits long range atomic order and has an x-ray diffraction pattern characterized by well-defined peaks.

As used herein, "electrochemically active phase" refers to a phase or domain that includes at least one electrochemically active metal and which reversibly alloys with Li when used in the negative electrode of a full cell.

As used herein, "electrochemically inactive phase" refers to a phase or domain that includes at least one electrochemically inactive metal and does not reversibly alloy with Li when used in the negative electrode of a full cell.

As used herein, "conducting phase" refers to a domain that has substantially high electrical conductivity, including metallic conductors, semi-metals and semiconductors, but is not substantially electrochemically active.

As used herein, "insulating phase" refers to a phase or domain that does not substantially conduct electricity and is not substantially electrochemically active.

As used herein, "electrochemically active" refers to materials or phases that can electrochemically react or alloy with lithium at voltages between 0 V and 2 V versus lithium metal.

As used herein, "electrochemically active material" refers to a substance that is electrochemically active, comprises least one electrochemically active phase and may additionally include conducting phases and insulating phases.

As used herein, "composite anode particles" refers to secondary particles that consist of electrochemically active material primary particles that are coupled together with an acid-base cement.

As used herein, "electrochemically inactive" refers to materials or phases that are not electrochemically reactive or do not alloy with lithium at voltages between 0 V and 2 V versus lithium metal.

As used herein, "lithiate" and "lithiation" refer to a process for adding lithium to an electrode material or electrochemically active phase.

As used herein, "delithiate" and "delithiation" refer to a process for removing from an electrode material or electrochemically active phase.

As used herein, "charge" and "charging" refer to a process for providing electrochemical energy to a cell.

As used herein, "discharge" and "discharging" refer to a process for removing electrochemical energy from a cell, e.g., when using the cell to perform desired work.

As used herein, "positive electrode" refers to an electrode (often called a cathode) where electrochemical reduction and lithiation occurs during a discharging process in a full cell.

As used herein, "negative electrode" refers to an electrode (often called an anode) where electrochemical oxidation and delithiation occurs during a discharging process in a full cell.

As used herein, the term "powder" refers to a material which exists in a particulate form comprising a plurality of particles wherein the average size of the particles is below 200 micrometers.

As used herein, the phrase "primary particles" refers to discrete particles that are substantially non-porous, normally do not reduce in particle size during grinding; and are made up of a single crystallite or an aggregation of crystallites that are tightly bound together.

As used herein, the phrase "secondary particles" refers to particles whose formation results from a bonding of two or more primary particles (e.g., physical, chemical, ionic, or covalent bonding of primary particles). Secondary particles normally include some porosity and are typically less dense than primary particles.

As used herein, the singular forms "a", "an", and "the" include plural referents unless the content clearly dictates otherwise. As used in this specification and the appended embodiments, the term "or" is generally employed in its sense including "and/or" unless the content clearly dictates otherwise.

As used herein, the recitation of numerical ranges by endpoints includes all numbers subsumed within that range (e.g. 1 to 5 includes 1, 1.5, 2, 2.75, 3, 3.8, 4, and 5).

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

Generally, the present disclosure is directed to use of cements as components in electrochemically active material compositions useful in electrodes for rechargeable batteries.

In some embodiments, the present disclosure relates to an anode composition for a rechargeable battery. The anode composition may include an electrochemically active material and a cement (e.g., in the form of composite anode particles).

In various embodiments, the anode composition may include an electrochemically active material that includes silicon. For example, silicon may be present in one or more of the following forms: elemental silicon, a metal silicide, a silicon carbide, or a silicon oxide. In some embodiments, silicon may be present as at least elemental silicon.

In some embodiments, the electrochemically active material may be in the form of multiphase particles, the multiphase particles including each of: (i) an electrochemically active phase that includes silicon; (ii) an insulating phase; and (iii) a conductive phase. The electrochemically active phase may consist essentially of elemental silicon, or may also include aluminum, carbon, zinc, gallium, germanium, silver, cadmium, indium, tin, antimony, gold, mercury, lead, bismuth, or combinations thereof.

In various embodiments, the insulating phase may include a ceramic material. The ceramic material may be an inorganic, non-metallic solid that can be prepared by the action of heat and subsequent cooling of constituent materials. The ceramic materials can have a crystalline or partly crystalline structure, or may be amorphous e.g., a glass). The insulating phase can include a borate, a phosphate, a carbonate, an oxide, a sulphate, a silicate, a halide and combinations thereof. Insulating phases that are useful in the provided composite particles include oxides of Li Na, Mg, Cu, Lu, Ce, Ti, Zr, K, Al, Si, B, and combinations thereof. In some embodiments, the provided composite particles include an insulating phase that is selected from $Al_2O_3$, CaO, MgO, $MgAl_2O_4$, $Li_2CO_3$, $SiO_2$, $B_2O_3$, LiF, and combinations thereof. The insulating phase can be stoichiometric, primarily if it is crystalline, or can be non-stoichiometric. By stoichiometric it is meant that the atomic ratios of the components of the phase can be represented by ratios of integers. Typically these components are solids and contain crystalline domains or grains. By non-stoichiometric it is meant that the atomic ratios of the components of the phase cannot be represented by a ratio of integers. Typically, non-stoichiometric phases are either partially crystalline or amorphous.

In some embodiments, the conducting phase of the provided composite particles may include a metal, a semi-metal, or a semiconductor. The composite particles may include a metal element, an alloy, a carbide, an aluminide, a silicide, a boride, a nitride, or a combination thereof. Exemplary conducting phases include Ti, V, Cr, Mn, Fe, Co, Ni, Cu, and their alloys. Exemplary carbide conducting phases include TiC and SiC. Exemplary suicide conducting phases include $FeSi$, $FeSi_2$, $CrSi_2$, $NiSi_2$, $COSi_2$, $TiSi_2$, $Cu_3Si$, $ZrSi_2$, and their ternary and higher order intermetallic compounds. Other exemplary conducting phases include $TiB_2$, TiN, $FeAl_3$, and $TiAl_3$. The conducting phase can be stoichiometric or nonstoichiometric in a similar fashion to the insulating phase.

In some embodiments, the anode composition may include an electrochemically active material having a formula (I):

$$Si_a Sn_b M_c C_d Q_e O_f E_g \qquad (I)$$

where a, b, c, d, e and f represent atomic percent values and (i) a>0; (ii) b≥0, (iii) c≥0, (iv) d≥0; (v) e≥0; (vi) f≥0; (vii) g≥0; (viii) M is one or more metals selected from the group consisting of manganese, molybdenum, niobium, tungsten, tantalum, iron, copper, titanium, vanadium, chromium, nickel, cobalt, zirconium, yttrium, or combinations thereof; (ix) Q is one or more elements selected from the group consisting of sodium, lithium, potassium, magnesium, calcium, titanium, boron, aluminum, a rare earth metal, or combinations thereof, and (x) E is one or more elements selected from the group consisting of boron or nitrogen.

The Si, Sn, M, C, Q, E, and O elements may be arranged in the form of a multi-phase microstructure comprising: (i) an amorphous or nanocrystalline phase comprising silicon; (ii) optionally a conducting nanocrystalline phase; (iii) a phase comprising silicon carbide when d>0; (iv) optionally an insulating nanocrystalline or amorphous phase, and (v) an amorphous or nanocrystalline phase comprising Sn when b>0. In various embodiments, a≥60 or 70, and d=0 or ≥10 or 15. In various embodiments a>70, b<4, 3, or 2, c<20 or 15, d<15, 10, or 5, and e<20, 15, 10, or 5. In various embodiments f<20, 15, 10, or 5. In various embodiments g<20, 15, 10, or 5. In some embodiments, M is one or more metals selected from the group consisting of iron, titanium, nickel, cobalt, molybdenum, and combinations thereof. In some embodiments f=0. In some embodiments f=0 and e=0. In some embodiments d=0, e=0, f=0 and g=0. In some embodiments b=0, d=0, e=0, f=0 and g=0.

In some embodiments, the anode composition may include an electrochemically active material having a formula (II):

$$Si_x Sn_q M_y C_z \qquad (II)$$

where q, x, y, and z represent atomic percent values and (i) (q+x)=>(2y+z); (ii) x>0; (iii) q≥0, (iv) y≥0 (v) z≥0; and (vi) M is one or more metals selected from the group consisting of manganese, molybdenum, niobium, tungsten, tantalum, iron, copper, titanium, vanadium, chromium, nickel, cobalt, zirconium, yttrium, and combinations thereof. The Si, Sn, M, and C elements may be arranged in the form of a multi-phase microstructure comprising: (i) an amorphous phase comprising silicon; (ii) nanocrystalline phase comprising a metal silicide; (iii) a phase comprising silicon carbide when z>0; and (iv) an amorphous phase comprising Sn when q>0. In various embodiments, x≥60 or 70, and z>0 or ≥10 or 15. In some embodiments, M is one or more metals selected from the group consisting of iron, titanium, nickel, cobalt, molybdenum, or combinations thereof. In various embodiments x>70, q<10, 5, or 3, and y<25, 20, or 15, and z<15, 10, or 5. In some embodiments y=0.

In some embodiments, any phases present in the electrochemically active material of the present disclosure may be amorphous or nanocrystalline.

In illustrative embodiments, the cement may be a dual-cured cement (e.g., acid-base cement), photo-initiated cement (e.g., UV-curable cement), tri-cure cement (e.g., chemical curing tertiary amine-peroxide reaction to polymerize methacrylate double bonds), thermally cured cement, or the like. In some embodiments, the cement may be an acid-base cement, such as those acid-base cements that are employed in dental applications. Generally, an acid source and a base source may be chosen such that may react so as to form the acid-base cement. A broad variety of acid sources and base sources may be suitable in the anode compositions of the present disclosure. Examples of suitable acid sources include poly(acrylic) acid, magnesium chloride ($MgCl_2$), potassium phosphate monobasic ($KH_2PO_4$), phosphoric acid ($H_3PO_4$), magnesium sulfate ($MgSO_4$), and ammonium phosphate monobasic ($NH_2PO_4$). Examples of suitable base sources include magnesium oxide (MgO), calcium oxide (CaO), zinc oxide (ZnO) and ammonia ($NH_3$), silicon oxide ($SiO_2$), and $SiO_2$—$Al_2O_3$—CaO glasses. A broad variety of the acid-base cements may be employed including, for example, phosphate cements, oxy-chloride and oxy-sulfate cements. Phosphate cements may include without limitation, an acid source that is a monobasic, dibasic, and/or tribasic phosphate salt with counterions sodium, potassium, magnesium, zinc, aluminum or combinations thereof. Further examples of suitable acid-base cements include polyalkenoate cements, oxysalt cements, and nonaqueous cements. These acid/base sources may be in the form of a powdered solid, an aqueous solution, and aqueous slurry, a nonaqueous solution or a nonaqueous slurry. Examples of suitable acid-base cements are also described in "Acid-base cements" by A. D. Wilson and J. W. Nicholson, Cambridge University Press, 1993, which is incorporated herein by reference in its entirety.

In various embodiments, the anode composition of the present disclosure, which may include an electrochemically active material and an acid-base cement, may be in the form of secondary composite particles. As will be discussed in further detail below, the anode composite particles may be manufactured to achieve any desired size. For example, the anode composite particles may have an average size (average major axial diameter or longest straight line between two points on a composite particle) of greater than 1 μm, greater than 5 μm, or greater than 10μ; or between 1-3 μm, between 5-20 μm, or between 20-50 μm. The anode composite particles may have an average surface area of less than 10 m²/g, less than 2 m²/g, or less than 1 m²/g; or between 0.2-1 m²/g, between 1-3 m²/g, or between 2-5 m²/g. In some embodiments, the amount of acid-base cement in the anode composite particles may be at least 40 wt. %, at least 20 wt. %, or at least 10 wt. % based upon the total weight of the anode composite particle; or between 10-20 wt. %, between 15-30 wt. %, or between 30-40 wt. % based upon the total weight of the anode composite particle. In order to maintain electrical connectivity between the electrochemically active material particles, the acid-base cement may comprise less than 40% by volume, less than 30% by volume or less than 20% by volume based upon the total volume of the anode composite particles.

The present disclosure further relates to negative electrode compositions that include the above-described anode composite particles. In some embodiments, the above-described anode composite particles may be combined with one or more materials to form an electrode composition. For example, the electrode composition may include an electrically conductive diluent to facilitate electron transfer from the composition to a current collector. Electrically conductive diluents include, for example, carbons, powdered metal, metal nitrides, metal carbides, metal silicides, and metal borides. Representative electrically conductive carbon diluents include carbon blacks such as Super P and Super S carbon blacks (both from MMM Carbon, Belgium), Shawanigan Black (Chevron Chemical Co., Houston, Tex.), acetylene black, furnace black, lamp black, graphite, carbon fibers and combinations thereof. In some embodiments, the amount of conductive diluent in the electrode composition may be at least 2 wt. %, at least 6 wt. %, or at least 8 wt. % based upon the total weight of the electrode coating. As a further example, the negative electrode compositions may include graphite to improve the density and cycling performance, especially in calendered coatings, as described in U.S. Patent Application Publication 2008/0206641 by Christensen et al., which is herein incorporated by reference in its entirety. The graphite may be present in the negative electrode composition in an amount of greater than 20 wt. %, greater than 50 wt. %, greater than 70 wt. % or even greater, based upon the total weight of the negative electrode composition. As another example, the negative electrode compositions may include a binder. Suitable binders include oxo-acids and their salts, such as sodium carboxymethylcellulose, polyacrylic acid and lithium polyacrylate. Other suitable binders include polyolefins such as those prepared from ethylene, propylene, or butylene monomers; fluorinated polyolefins such as those prepared from vinylidene fluoride monomers; perfluorinated polyolefins such as those prepared from hexafluoropropylene monomer; perfluorinated poly(alkyl vinyl ethers); perfluorinated poly(alkoxy vinyl ethers); or combinations thereof. Other suitable binders include polyimides such as the aromatic, aliphatic or cycloaliphatic polyimides and polyacrylates. The binder may be crosslinked. In some embodiments, the amount of binder in the electrode composition may be at least 5 wt. %, at least 10 wt. %, or at least 20 wt. % based upon the total weight of the electrode coating. The amount of binder in the electrode composition may be less than 30 wt. %, less than 20 wt. %, or less than 10 wt. % based upon the total weight of the electrode coating.

The present disclosure further relates to methods of making the above-described anode compositions. The method may include providing appropriate precursor materials (based on the desired anode composition), combining the precursor materials with a cement precursor (e.g., a base source or an acid source), and mechanically milling the resulting mixture. Precursor materials may include, for example, Si, $FeSi_2$, Fe, $Al_2O_3$, $MgAl_2O_3$, $LiAlO_2$, $Li_2CO_3$, $SiO_2$, $B_2O_3$, and LiF, $FeSi_2$, $CrSi_2$, $NiSi_2$, $CoSi_2$, $TiSi_2$, $Cu_3Si$, $ZrSi_2$, $TiB_2$, TiN, $FeAl_3$, $TiAl_3$, CaO, MgO, Sn, C, and combinations thereof. The acid or base source may include any of the above described acid or base sources. The base or acid source may be present in the mill base in an amount of at least 30 wt. %, at least 20 wt. %, or at least 10 wt. % based upon the total weight of the mill base; less than 40 wt. %, less than 30 wt. %, or less than 15 wt. % based upon the total weight of the mill base.

In some embodiments, the mechanical milling can include various methods of ball milling, such as high energy ball milling, attritor milling, Sweco milling, planetary milling and low energy ball milling as described in U.S. Pat. No. 8,287,772 (Le et al.), which is herein incorporated by reference in its entirety. Mechanical milling can be performed under an inert atmosphere or under reactive atmospheres including gases such as nitrogen or hydrogen. Other methods known to make composite materials may also be used such as sputter deposition or sintering a powdered compact.

In various embodiments, following milling or other composite forming process, the milled composition may be further process to form a cement. For example, either a base source or an acid source (depending on which source type was included in the previous step) may be added to the milled composition to form an acid-base cement. For example, the base or acid source may be added such that it is present in an amount of at least 20 wt. %, at least 10 wt. %, or at least 5 wt. % based upon the total weight of the anode composite particles; less than 30 wt. %, less than 20 wt. %, or less than 10 wt. % based upon the total weight of the anode composite particles. This mixture may then be subjected to heat treatment to form a cement monolith. Alternatively, if the cement is, for example, a UV-curable cement, the mixture may be subjected to a UV treatment to form a cement monolith.

In various embodiments, following formation of the cement monolith, the monolith may be processed (e.g., fractured (e.g., hammered, crushed, ground) and sieved) to obtain anode composite particles of any desired size or surface area. For example, the monolith may be processed to obtain anode composite particles having an average size or average surface area as described above.

The present disclosure is further directed to methods of making negative electrodes that include the above-described anode compositions. In illustrative embodiments, to make a negative electrode, the anode composite particles, optionally containing coating viscosity modifiers such as carboxymethylcellulose and other additives known by those skilled in the art such as a conductive diluent, may be mixed in a suitable coating solvent such as water, ethanol, methanol, isopropanol, n-propanol or N-methylpyrrolidinone with a polymeric binder to form a coating dispersion or coating mixture. The dispersion may then be mixed thoroughly and applied to a metal foil current collector by any appropriate dispersion coating technique (e.g., knife coating, notched bar coating, slot-die coating, dip coating, spray coating, electrospray coating, or gravure coating). The current collectors are typically thin foils of conductive metals such as, for example, copper, stainless steel, or nickel foil. After the slurry is coated onto the current collector foil, it may be allowed to dry followed usually by drying in a heated oven to remove solvent. The negative electrode can be compressed by pressing between two plates or rollers, as known by those skilled in the art. The electrode may also be provided with a raised pattern as disclosed in U.S. Patent Application Publication No. 2008/0248386 (Obrovac et al.).

The present disclosure is further directed to lithium-ion electrochemical cells that include a positive electrode and the above-described negative electrodes. Exemplary positive electrode materials include lithium transition metal oxide intercalation compounds such as $LiCoO_2$, $LiCo_{0.2}Ni_{0.8}O_2$, $LiMn_2O_4$, $LiFePO_4$, $LiNiO_2$, or lithium mixed metal oxides of manganese, nickel, and cobalt in any proportion. Blends of these materials can also be used in positive electrodes. Other exemplary cathode materials are disclosed in U.S. Pat. No. 6,680,145 (Obrovac et al.) and include transition metal grains in combination with lithium-containing grains. Suitable transition metal grains include, for example, iron, cobalt, chromium, nickel, vanadium, manganese, copper, zinc, zirconium, molybdenum, niobium, or combinations thereof with a grain size no greater than about 50 nanometers. Suitable lithium-containing grains can be selected from lithium oxides, lithium sulfides, lithium halides (e.g., chlorides, bromides, iodides, or fluorides), or combinations thereof. The positive electrode and negative electrode can be combined with an electrolyte to form a lithium ion electrochemical cell. In the cell, the electrolyte may be in contact with both the positive electrode composition and the negative electrode composition, and the positive electrode and the negative electrode are not in physical contact with each other; typically, they are separated by a polymeric separator film sandwiched between the electrodes. The electrolyte may be liquid, solid, or a gel. Examples of solid electrolytes include polymeric electrolytes such as polyethylene oxide, polytetrafluoroethylene, fluorine-containing copolymers, and combinations thereof. Examples of liquid electrolyte solvents include ethylene carbonate (EC), 1-fluoroethylene carbonate (FEC), diethyl carbonate (DEC), dimethyl carbonate (DMC), ethyl methyl carbonate (EMC), vinyl carbonate (VC), propylene carbonate (PC), and combinations thereof. The electrolyte solvent may be provided with a lithium electrolyte salt to make an electrolyte. Examples of suitable lithium electrolyte salts include $LiPF_6$, $LiBF_4$, $LiClO_4$, lithium bis(oxalato)borate, $LiN(CF_3SO_2)_2$, $LiN(C_2F_5SO_2)_2$, $LiAsF_6$, $LiC(CF_3SO_2)_3$, and combinations thereof.

In accordance with the compositions and methods of the present disclosure, a large particle size and low surface area secondary active material particle may be obtained. Such secondary particles are believed to have improved resistance to fracture during processing and to maintain their integrity during repeated charge/discharge cycles in a battery. Furthermore, the low surface area obtained for such secondary particles is believed to result in improved thermal stability.

In some embodiments, lithium-ion electrochemical cells that incorporate the negative electrodes of the present disclosure may exhibit a capacity retention at cycle 50, 100, or 500 of better than 90%, better than 95%, better than 98%, or even better than 99%.

In some embodiments, lithium-ion electrochemical cells that incorporate the negative electrodes of the present disclosure may exhibit an average coulombic efficiency over at least 20 cycles, at least 30 cycles, or at least 40 cycles of better than 99.7%, better than 99.8%, or even better than 99.9%.

In some embodiments, the anode composite particles have a larger volumetric capacity than graphite (720 Ah/L) when fully lithiated in electrochemical cells. The anode particles may have fully lithiated volumetric capacities of at least 800 Ah/L, 1500 Ah/L, or at least 2000 Ah/L.

The disclosed electrochemical cells can be used in a variety of devices including, without limitation, portable computers, tablet displays, personal digital assistants, mobile telephones, motorized devices (e.g., personal or household appliances and vehicles), instruments, illumination devices (e.g., flashlights) and heating devices. One or more electrochemical cells of this invention can be combined to provide battery pack.

The operation of the present disclosure will be further described with regard to the following detailed examples. These examples are offered to further illustrate various specific embodiments and techniques. It should be understood, however, that many variations and modifications may be made while remaining within the scope of the present disclosure.

EXAMPLES

X-Ray Diffraction (XRD) Characterization

X-ray diffraction was used to identify the crystalline structure of the exemplary composites below. A Rigaku Ultima IV diffractometer equipped with a copper target X-ray tube ($K\alpha$, $\lambda=0.154056$ nm), a diffracted graphite monochromator, and a scintillation detector was used for the diffraction measurements. The divergence and anti-scatter slits used were set both at 2/3°, while the receiving slit was set at 0.3 mm. The X-ray tube was powered to 45 kV at 40 mA.

Scanning Electron Microscope (SEM) Characterization

A Phenom G2-pro Scanning Electron Microscope (SEM) (Nanoscience, Arizona) was used to study the particle size and morphology of the exemplary composites.

Brunauer-Emmett-Teller (BET) Characterization

A Micromeritics Flowsorb II 2300 surface area analyzer was used to determine the surface area of the exemplary composites by the single-point Brunauer, Emmett, and Teller (B.E.T) method.

Procedure for Preparing an Alloy Electrode, Cell Assembly and Cell Testing

Electrodes were prepared by the following procedure. 0.8 g of alloy powder or alloy composite particles, 0.12 g of Super-P carbon black (MMM Carbon, Belgium), and 0.4 g of polyimide binder (PI-2555, HD Microsystems), a 20 weight percent solution in N-methyl pyrrolidinone (NMP, Aldrich) were mixed in a 30 mL Nalgene vessel. Electrode slurries were mixed in a Kurabo Mazerustar (Osaka, Japan) KK-50S planetary mixer for two cycles (600 s total). Each cycle on the Mazerustar consisted of three sets of 100 s where the revolution was set to 1140 rpm and the rotation was set to 680 rpm. The resulting slurry was hand spread onto an 18-micrometer thick Cu foil using a plastic coating bar with a 0.004 inch gap. The coating was dried in an oven at 120° C. for 1.5 hours in air. Electrode disks (d=12.7 mm) were punched from the coated electrode foils and then heated at 300° C. for 3 hours in Ar before being used as an electrode for a cell.

Half cells were prepared using 2325 coin-type cells. All cell assembly procedures were performed in an argon-filled glovebox (VAC, USA). The cells were constructed from the following components and in the following order. Negative terminal/Cu spacer/Li metal film/Separator/alloy electrode/Cu spacer/Positive terminal. Each cell consisted of two 18 mm diameter×0.76 mm thick disks of Cu spacer, a 12.7 mm diameter disk of alloy electrode, two 21 mm diameter micro porous separators (Celgard 2300, 3M), 18 mm diameter× 0.38 mm thick disk of Li foil (lithium ribbon available from Aldrich Chemical Co., Milwaukee, Wis.). The electrolyte was a 1M LiPF6 in EC/DEC/FEC 30/60/10 by volume solution (EC, ethylene carbonate; DEC, diethyl carbonate; FEC, fluoroethylene carbonate, all from BASF). The cell was filled with 90 microliters of electrolyte solution. The cell was crimp sealed prior to testing.

Cells were cycled at 30° C. with a Maccor Series 4000 Automated Test System at a C/10 rate and trickled discharged to C/40 in the first cycle. From then on, cells were cycled in the same voltage range but at a C/4 rate and trickled to C/20 at the end of discharge, where 1C rate is defined in the examples below. Cells were allowed 15 min rest at open circuit at the end of every cycle.

Example 1

Figure 2:
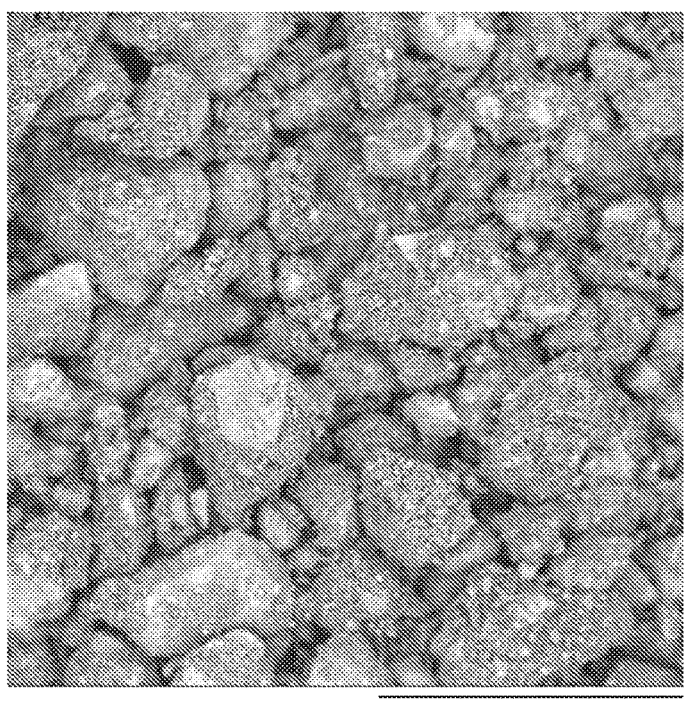
FIG. 2 depicts an SEM image of the composite particles of Example 1.

Si/FeSi/FeSi$_2$/Fe/[SiO$_2$/Al$_2$O$_3$/CaO/PAA] was prepared by milling 2.145 g of Si (Aldrich 98%-325 mesh), 1.225 g of Fe (<10 µm, Alfa Aesar), 0.0739 g of SiO$_2$ (0.007 µm, Aldrich), 0.1244 g of Al2O3 (Aldrich), and 0.1361 g of CaO (Sigma Aldrich) with 115 g of 3/16" tungsten carbide balls under an argon atmosphere for two hours in a 40 ml Spex mill container using a SPEX MILL (Model 8000-D, Spex Certiprip, Metuchen, N.J.). The speed of the Spex mill was 975±15 rpm. As-milled material was passed through a sieve with a mesh 53 µm opening. And then 2.58 g of as-obtained powder was mixed with 1.2 g of 35 wt % poly(acrylic) acid solution in a mortar and a pestle. Next, the mixture was cured at 60° C. overnight in an oven. The resulting hard monolith was broken with a hammer, then ground by hand and sieved to a 53 µm particle size. The XRD pattern of the resulting alloy composite particles showed peaks characteristic of crystalline Si, Fe, FeSi and FeSi$_2$ phases as shown in FIG. 1. The X-ray diffraction pattern did not contain peaks from SiO$_2$, Al$_2$O$_3$, and CaO phases indicating that these phases were amorphous. The SEM image showed that the particle size range was between 10 and 40 µm and the large secondary particles were composed of small primary particles, as shown in FIG. 2. The BET measurement shows that the surface area was 0.9 m2/g.

Figure 3:
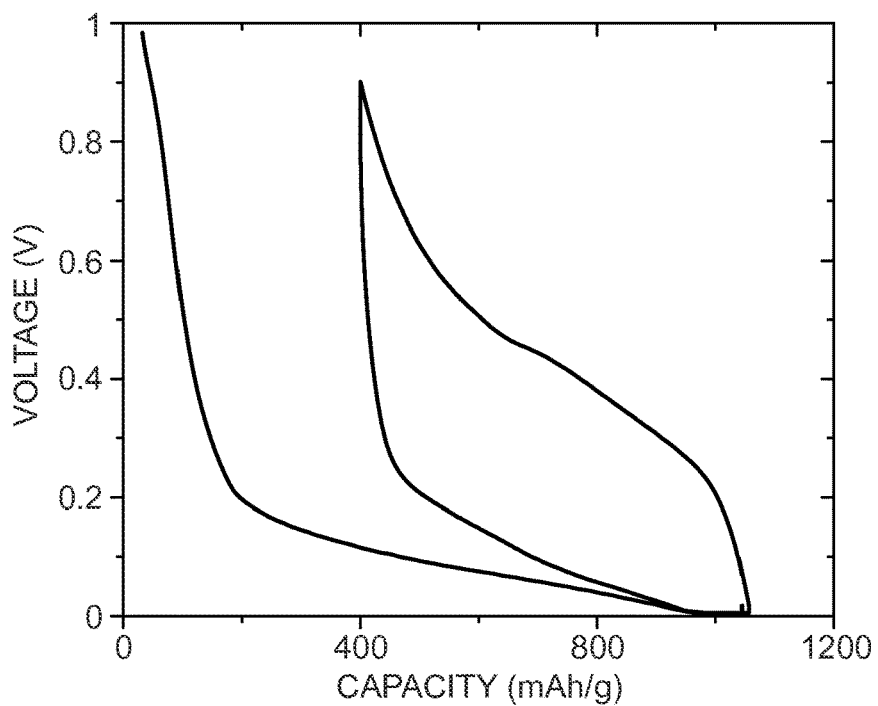
FIG. 3 depicts a voltage curve of a coin cell that included, as an anode material, the composite particles of Example 1.
Figure 4:
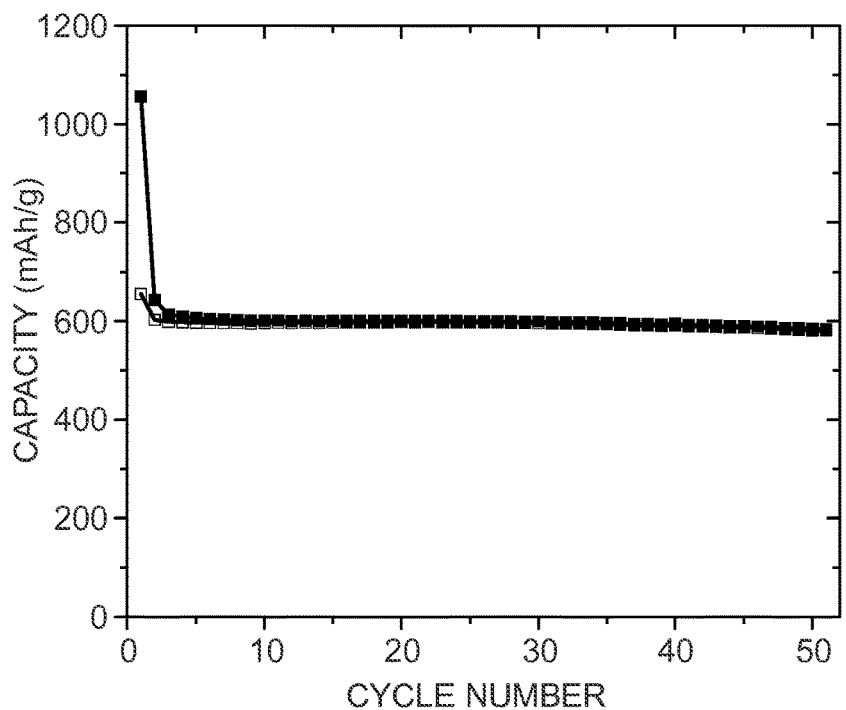
FIG. 4 depicts the cycling characteristics of a coin cell that included, as an anode material, the composite particles of Example 1.

Electrodes and coin cells were prepared and tested according to the Procedure for Preparing an Alloy Electrode, Cell Assembly and Cell Testing, with 1C=710 mAh/g. The voltage curve voltage curve and cycling characteristics of this electrode are shown in FIGS. 3 and 4. The alloy composite particles had a reversible capacity of about 727 mAh/g after 50 cycles.

Example 2

Figure 5:
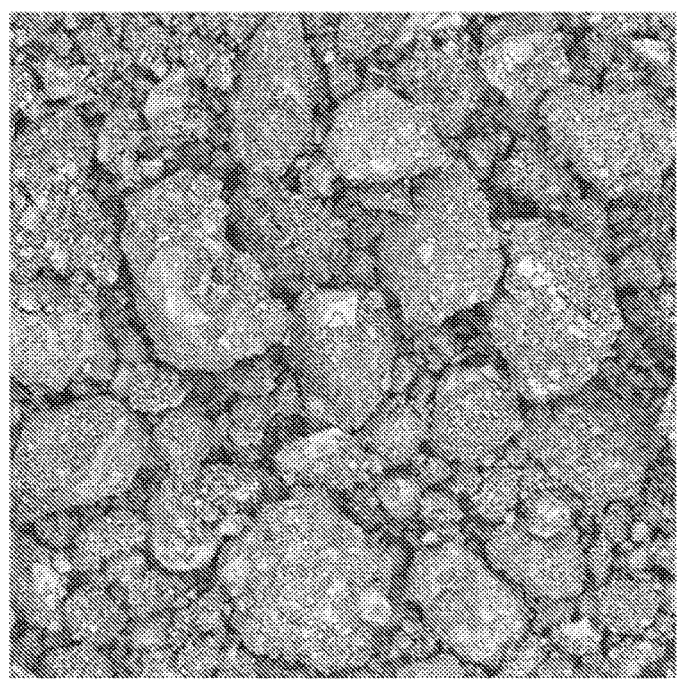
FIG. 5 depicts an SEM image of the composite particles of Example 2.

V6/[SiO2/Al2O3/CaO/PAA] was prepared using the procedure described in Example 1, except that 3.33 g of V6 alloy powder (L-20772 V6 Si alloy powder, 3M Company) was used instead of 2.145 g of Si (Aldrich 98%-325 mesh) and 1.225 g of Fe (<10 µm, Alfa Aesar). The SEM image showed that the particle size range was between 15 and 50 µm and the large alloy composite secondary particles were composed of small electrochemically active material primary particles as shown in FIG. 5. The BET measurement shows that the surface area was 0.6 m2/g.

Figure 6:
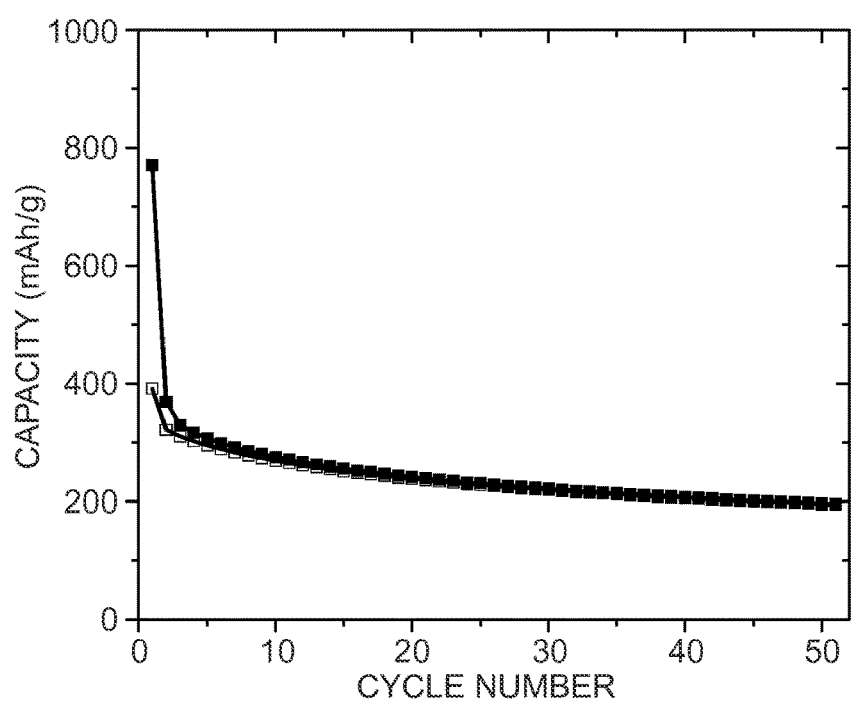
FIG. 6 depicts the cycling characteristics of a coin cell that included, as an anode material, the composite particles of Example 2.

Electrodes and coin cells were prepared and tested according to the Procedure for Preparing an Alloy Electrode, Cell Assembly and Cell Testing, with 1C=815 mAh/g. The cycling characteristics of this electrode are shown in FIG. 6.

Comparative Example 1

Figure 7:
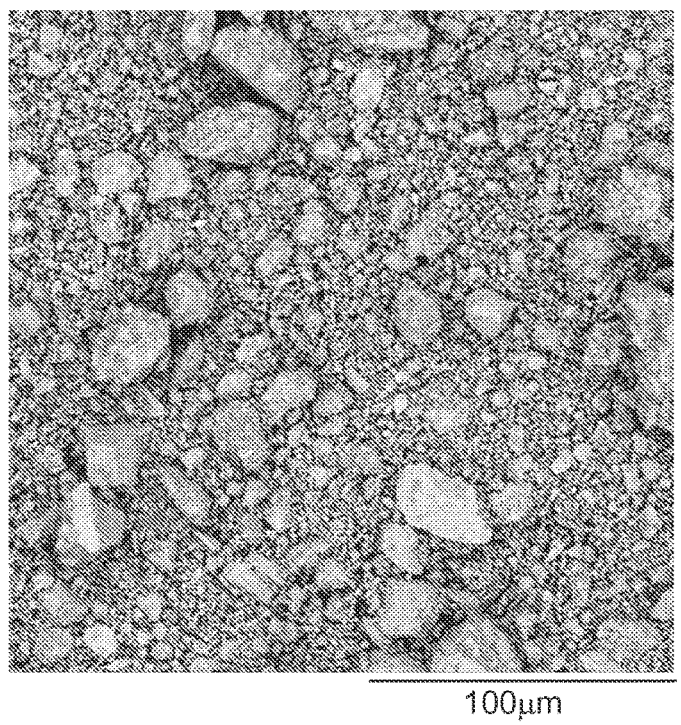
FIG. 7 depicts an SEM image of the particles of Comparative Example 1.

Si/FeSi/FeSi2/Fe was prepared by milling 2.145 g of Si (Aldrich 98%-325 mesh) and 1.225 g of Fe (<10 µm, Alfa Aesar) with 115 g of 3/16" tungsten carbide balls under an argon atmosphere for two hours in a 40 ml Spex mill container using a SPEX MILL (Model 8000-D, Spex Certiprip, Metuchen, N.J.). The speed of the Spex mill was 975±15 rpm. As-milled material was passed through a sieve with a mesh 53 µm opening. The XRD pattern of the resulting powder showed peaks characteristic of crystalline Si, Fe, FeSi and FeSi$_2$ phases. The SEM image showed that many fine particles with a diameter less than 3 µm along with a few large particles as shown in FIG. 7. The BET measurement showed that the surface area was 2.6 m2/g.

Figure 8:
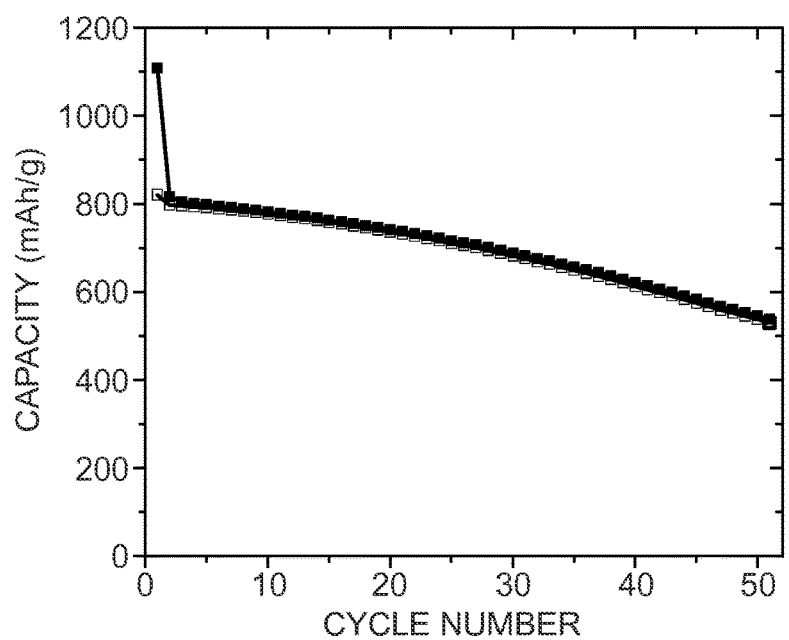
FIG. 8 depicts the cycling characteristics of a coin cell that included, as an anode material, the particles of Comparative Example 1.

Electrodes and coin cells were prepared and tested according to the Procedure for Preparing an Alloy Electrode, Cell Assembly and Cell Testing, with 1C=780 mAh/g. The cycling characteristics of this composite are shown in FIG. 8.

Comparative Example 2

Figure 9:
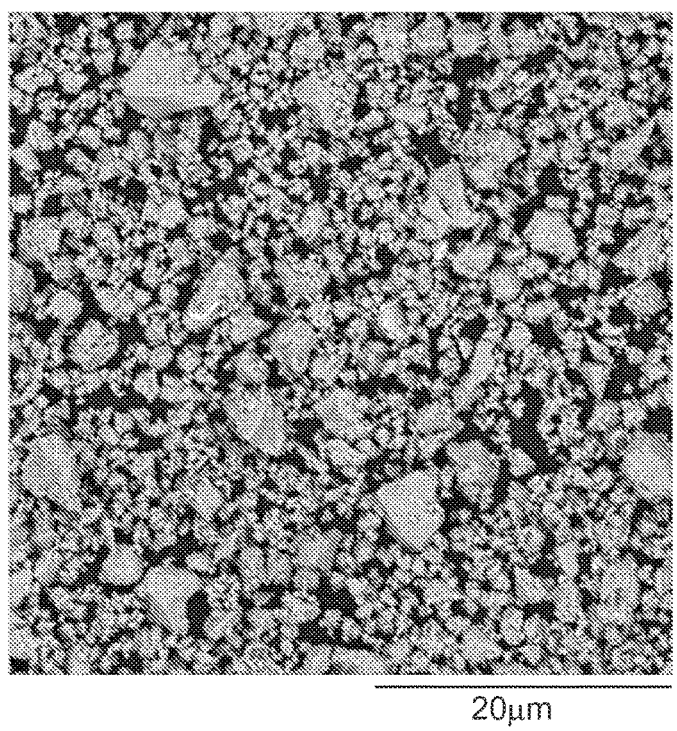
FIG. 9 depicts an SEM image of the particles of Comparative Example 2.

V6 alloy was used as received from 3M Company. The SEM image shows many fine particles with a diameter about 3 µm along with a few large particles as shown in FIG. 9. The BET measurement shows that the surface area was 3.6 m2/g.

Figure 10:
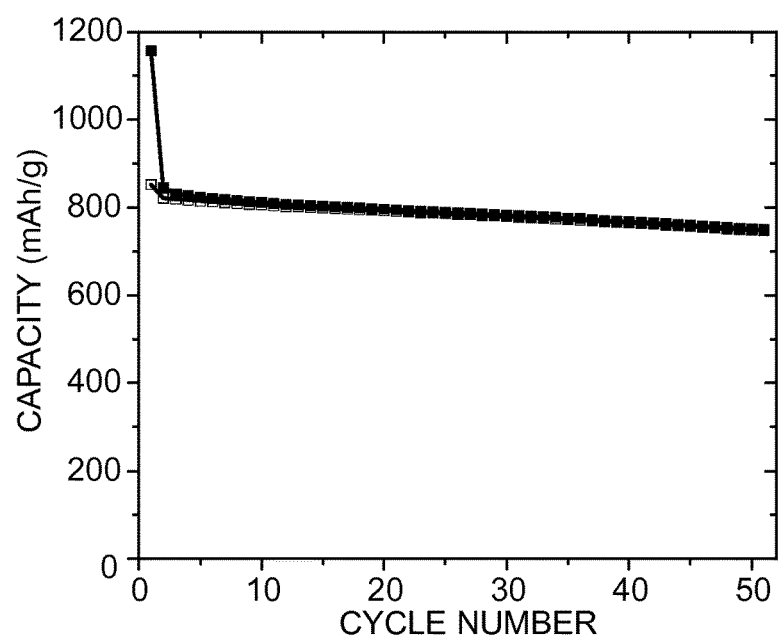
FIG. 10 depicts the cycling characteristics of a coin cell that included, as an anode material, the particles of Comparative Example 2.

Electrodes and coin cells were prepared and tested according to the Procedure for Preparing an Alloy Electrode, Cell Assembly and Cell Testing, with 1C=1040 mAh/g. The cycling characteristics of this electrode are shown in FIG. 10.

Example 3

Figure 11:
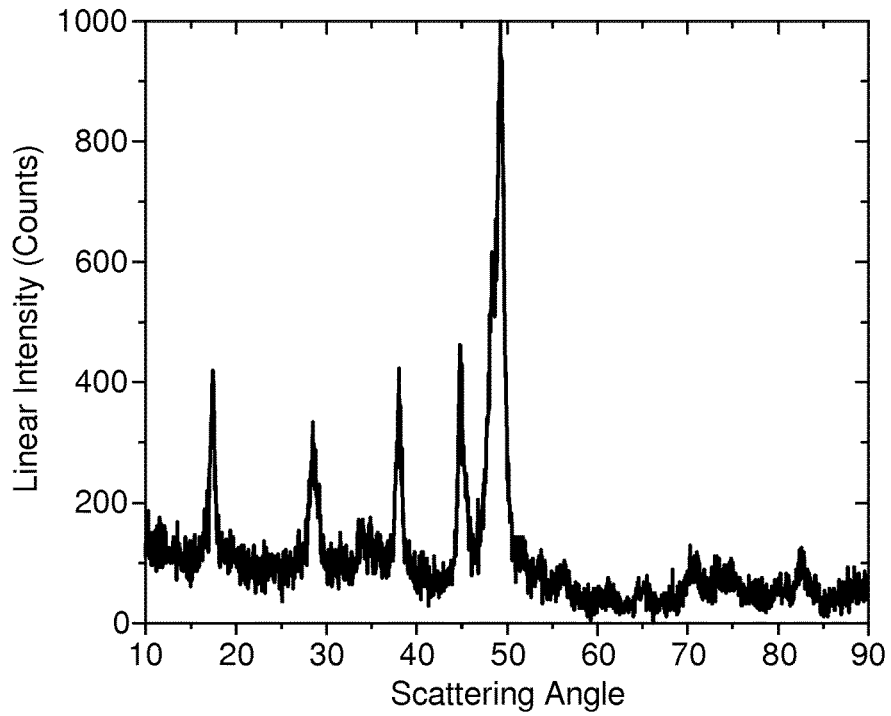
FIG. 11 depicts the XRD pattern of the composite particles of Example 3.

Si/FeSi/FeSi$_2$/Fe/[PAA] powder was prepared in the same way as the Si/FeSi/FeSi$_2$/Fe/[SiO$_2$/Al$_2$O$_3$/CaO/PAA] powder described in Example 1, excepting that SiO$_2$, Al$_2$O$_3$, and CaO were omitted from the preparation process. The XRD pattern of the resulting anode composite particles showed peaks characteristic of crystalline Si, Fe, SiFe, and FeSi$_2$ phases as shown in FIG. 11. A BET surface area measurement shows that the surface area was 0.7 m2/g.

Figure 12:
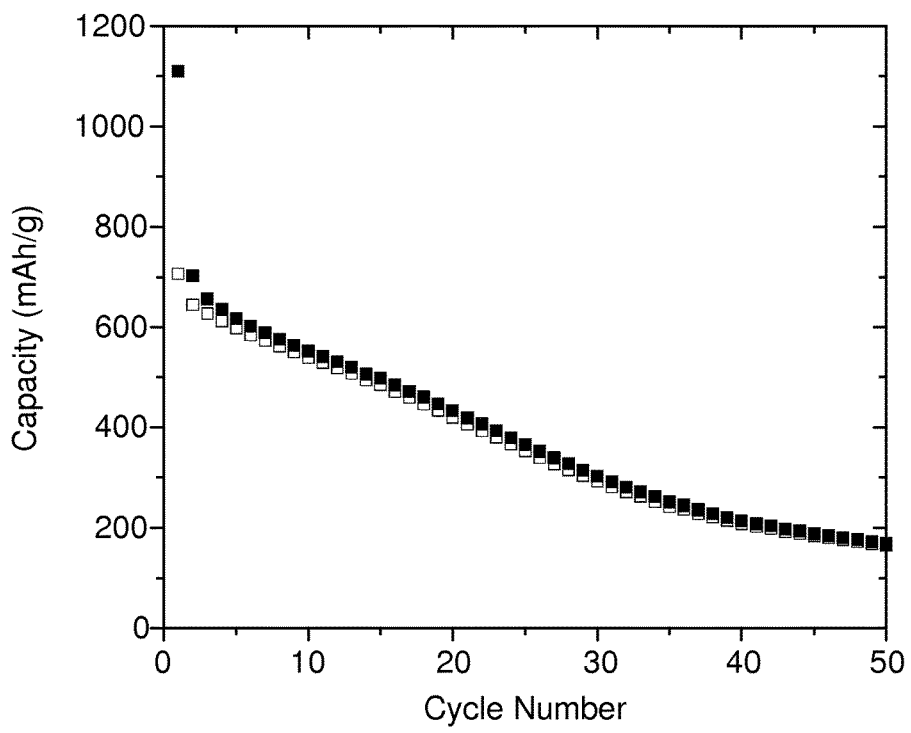
FIG. 12 depicts the cycling characteristics of a coin cell that included, as an anode material, the composite particles of Example 3.

Electrodes and coin cells were prepared and tested according to the Procedure for Preparing an Alloy Electrode, Cell Assembly and Cell Testing, with 1C=670 mAh/g. The cycling characteristics of this electrode are shown in FIG. 12.

What is claimed is:

1. An anode composition comprising:
   an electrochemically active material comprising silicon; and
   a cement;
   wherein the electrochemically active material and the cement form secondary composite particles, the secondary composite particles comprising the electrochemically active material and the cement.

2. The anode composition of claim 1, wherein the cement comprises an acid-base cement.

3. The anode composition according to claim 1, wherein the electrochemically active material comprises an insulating phase.

4. The anode composition according to claim 1, wherein the electrochemically active material comprises a conducting phase.

5. The anode composition according to claim 1, wherein the silicon is present in a form selected from the following: elemental silicon, a metal silicide, a silicon carbide, a silicon nitride, a silicon boride, a silicon oxide, or combinations thereof.

6. The anode composition according to claim 1, wherein the electrochemically active material comprises elemental silicon.

7. The anode composition according to claim 1, wherein the electrochemically active material has a formula (I):

(I)

where a, b, c, d, e, f and g represent atomic percent values and (i) a>0; (ii) b≥0, (iii) c≥0, (iv) d≥0; (v) e≥0; (vi) f≥0;

(vii) g≥0; (viii) M is one or more metals selected from the group consisting of manganese, molybdenum, niobium, tungsten, tantalum, iron, copper, titanium, vanadium, chromium, nickel, cobalt, zirconium, yttrium, or combinations thereof; (ix) Q is one or more elements selected from the group consisting of sodium, lithium, potassium, magnesium, calcium, titanium, boron, aluminum, a rare earth metal, or combinations thereof; and (x) E is one or more elements selected from the group consisting of boron and nitrogen.

8. The anode composition according to claim 1, wherein the electrochemically active material has a formula (II):

$$Si_xSn_qM_yC_z \qquad (II)$$

where q, x, y, and z represent atomic percent values and (i) $(q+x)>(2y+z)$; (ii) $x>0$; (iii) $q≥0$, (iv) $z≥0$; (v) $y≥0$; and (vi) M is one or more metals selected from manganese, molybdenum, niobium, tungsten, tantalum, iron, copper, titanium, vanadium, chromium, nickel, cobalt, zirconium, yttrium, or combinations thereof.

9. The anode composition according to claim 8, wherein the Si, Sn, M, and C elements are arranged in the form of a multi-phase microstructure comprising: (i) an amorphous phase comprising silicon; (ii) a nanocrystalline phase comprising a metal silicide; (iii) a phase comprising silicon carbide when $z>0$; and (iv) an amorphous phase comprising Sn when $q>0$.

10. The anode composition according to claim 2, wherein the composite particles have an average size of between 5-50 μm.

11. The anode composition according to claim 2, wherein the composite particles have an average surface area of between 0.1-10 m²/g.

12. The anode composition according to claim 2, wherein the amount of cement in the particles is between 5-40 wt. %, based upon the total weight of the composite particles.

13. A rechargeable battery comprising:
a cathode;
an electrolyte; and
an anode comprising the anode composition according to claim 1.

14. An electronic device comprising a rechargeable battery according to claim 13.

15. A method of making an anode composition, the method comprising:
combining (i) precursor materials of an electrochemically active material comprising silicon; and (ii) a base source to form a mixture;
milling the mixture to form a milled mixture;
combining the milled mixture and an acid source to form a second mixture; and
subjecting the second mixture to a heat treatment to form an acid-base cement monolith.

16. The method of making an anode composition according to claim 15, wherein the acid source comprises an aqueous solution of a polymeric acid.

17. The method of making an anode composition according to claim 16, wherein the polymeric acid comprises poly(acrylic acid).

18. A method of making a rechargeable battery, the method comprising:
providing a cathode;
providing an anode, wherein the anode comprises the anode composition according to claim 1; and
incorporating the cathode and anode into a battery comprising an electrolyte.

19. A negative electrode composition comprising:
the anode composition according to claim 1;
graphite; and
a binder.

20. The rechargeable battery of claim 13, wherein the rechargeable battery comprises a lithium-ion battery.

* * * * *